(No Model.) 6 Sheets—Sheet 1.
N. JOHNSON & J. STOCKER.
AMMONIA OR OTHER PUMP.
No. 494,956. Patented Apr. 4, 1893.
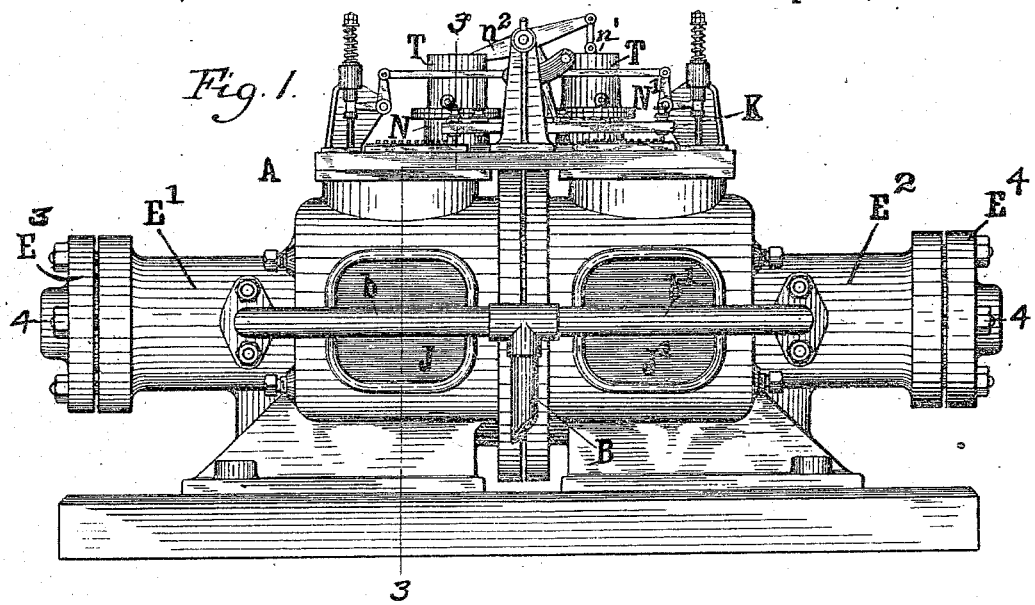
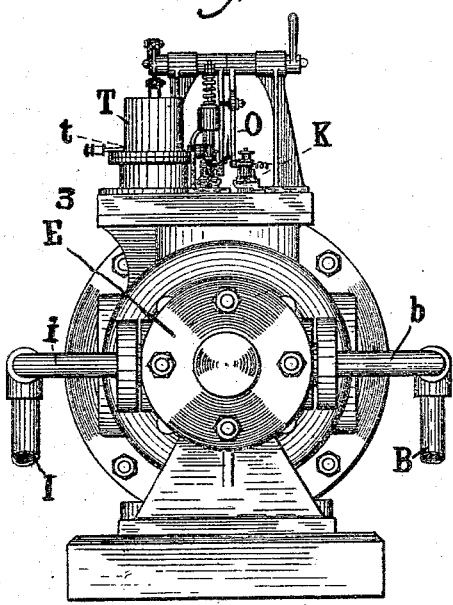
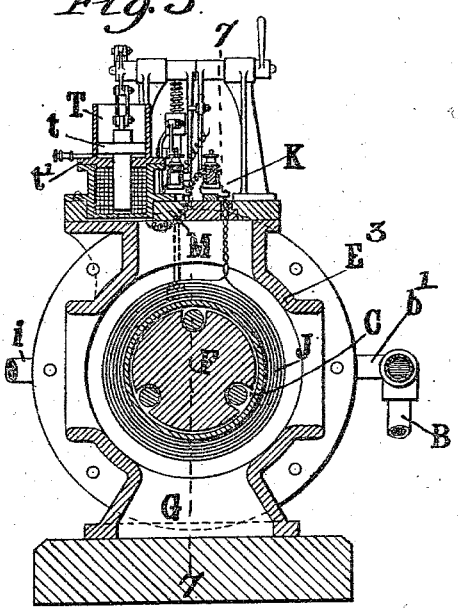

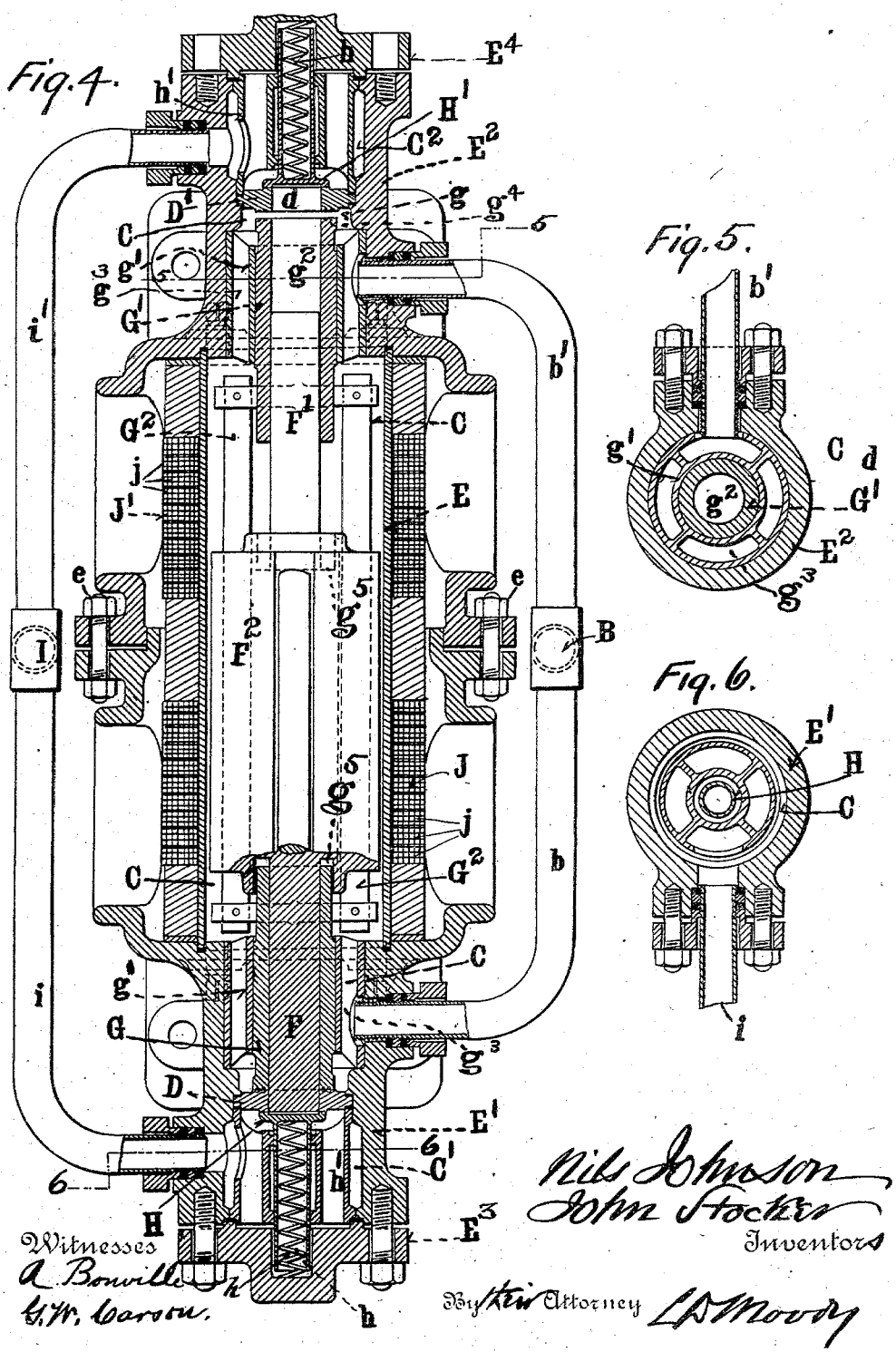

(No Model.) 6 Sheets—Sheet 3.
N. JOHNSON & J. STOCKER.
AMMONIA OR OTHER PUMP.
No. 494,956. Patented Apr. 4, 1893.
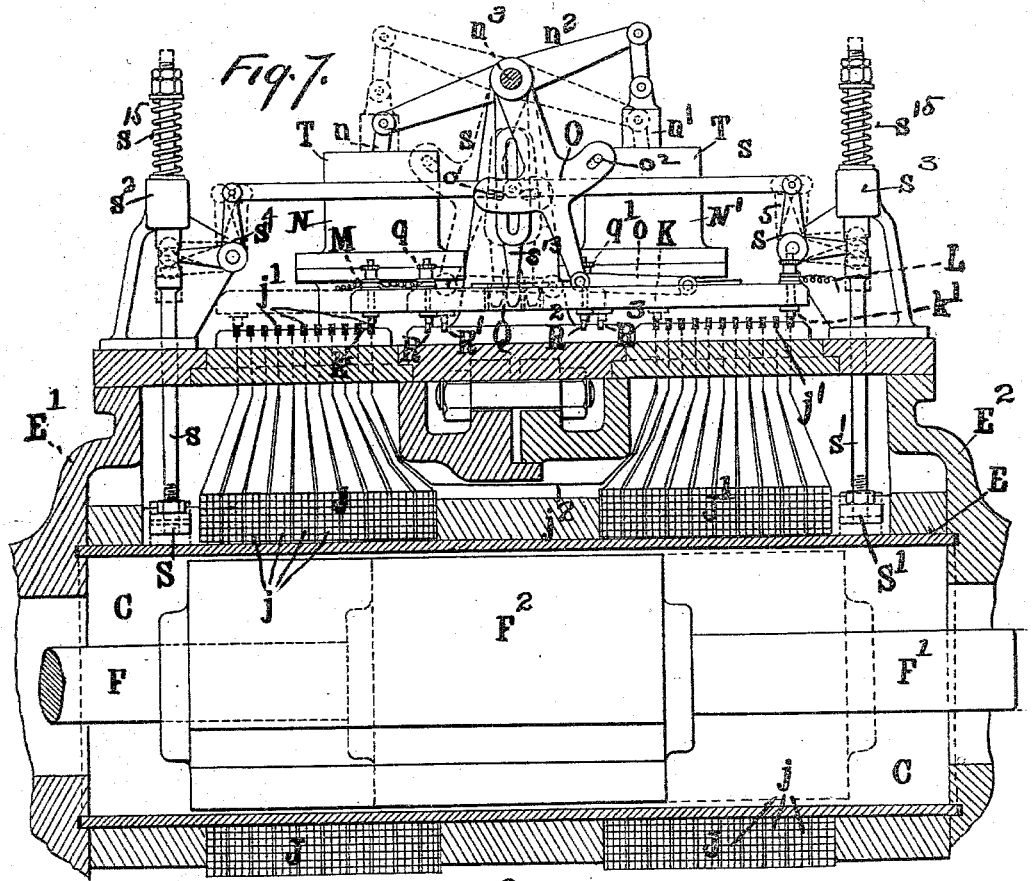
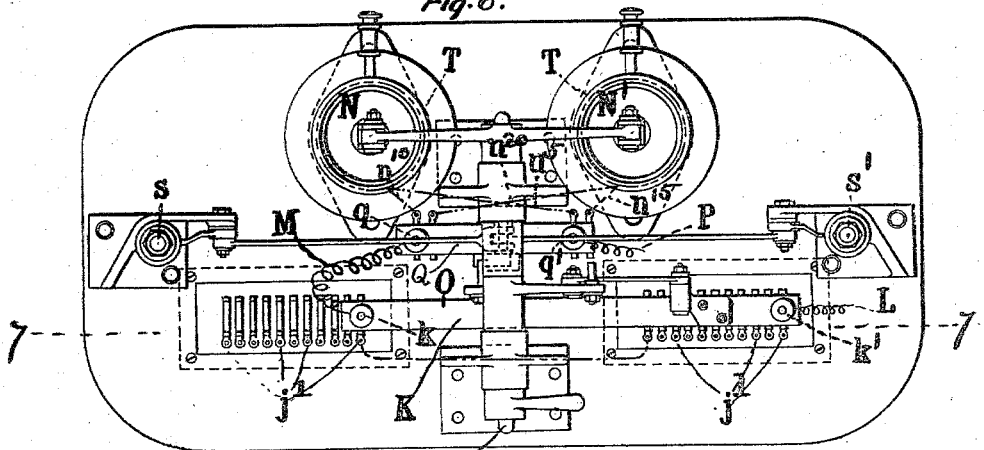

(No Model.) 6 Sheets—Sheet 4.

N. JOHNSON & J. STOCKER.
AMMONIA OR OTHER PUMP.

No. 494,956. Patented Apr. 4, 1893.

Witnesses
A. Bonville
G. W. Carson

Nils Johnson
John Stocker
Inventors
By their Attorney
C. D. Moody

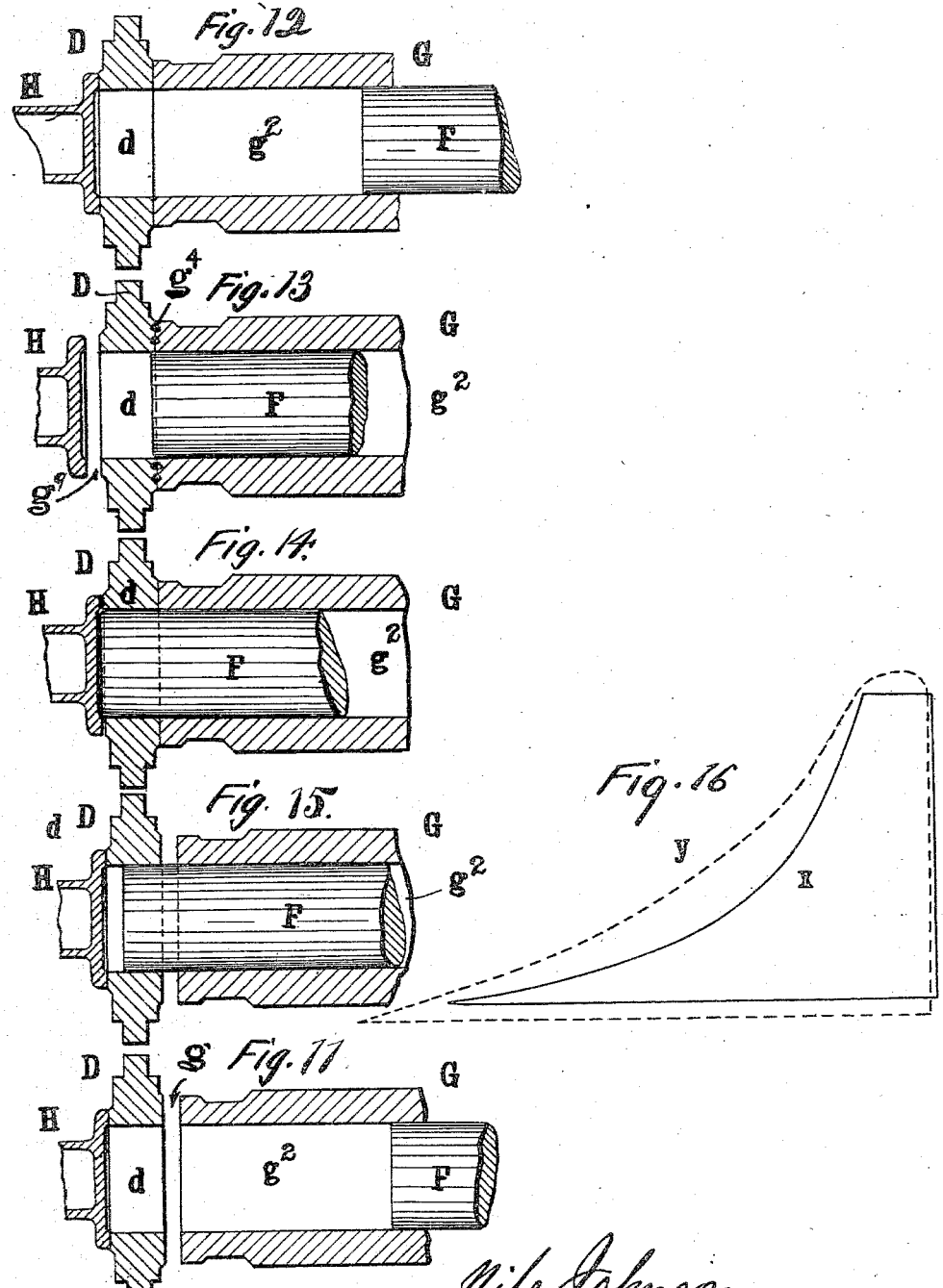

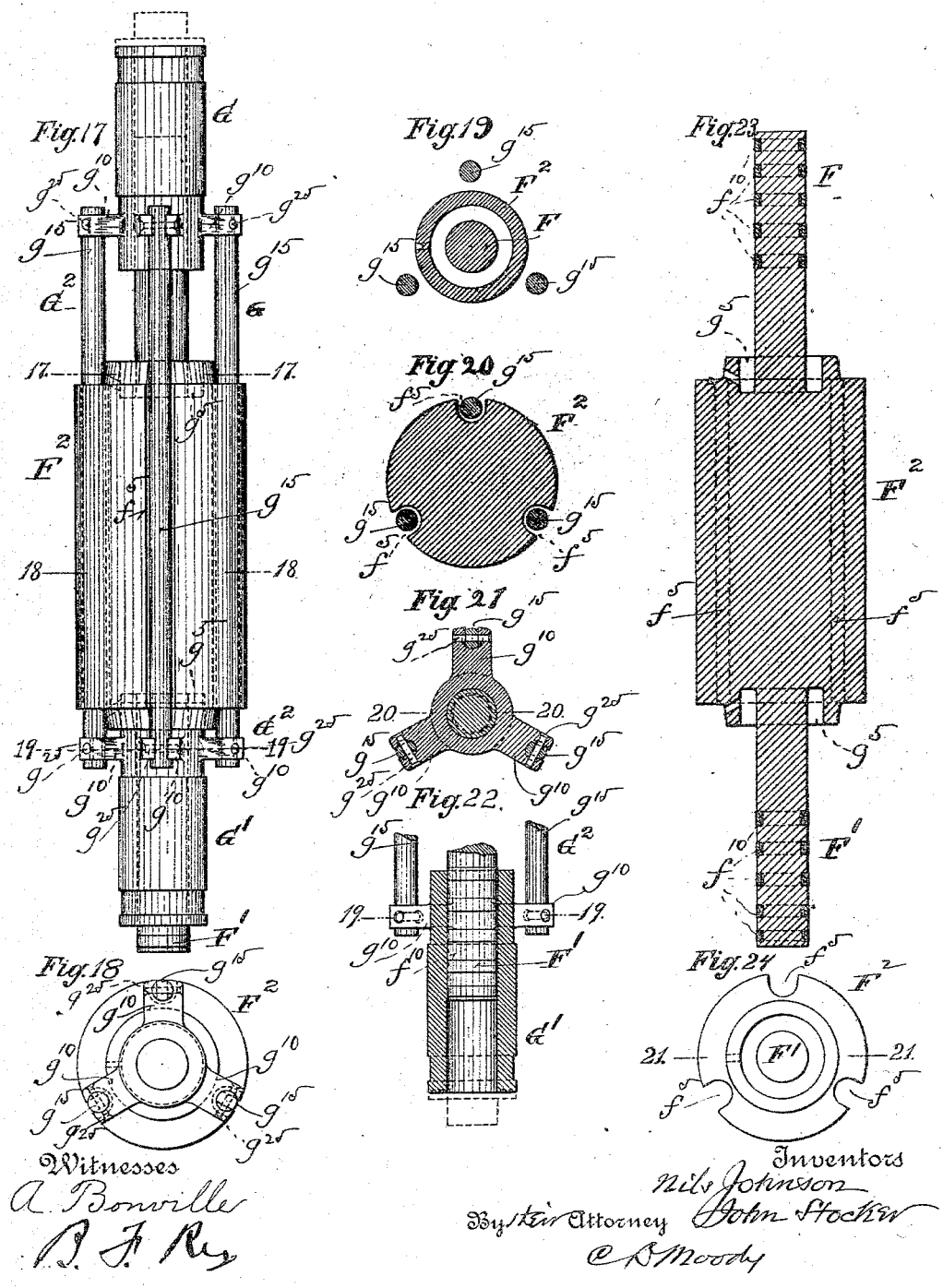

UNITED STATES PATENT OFFICE.

NILS JOHNSON AND JOHN STOCKER, OF ST. LOUIS, MISSOURI.

AMMONIA OR OTHER PUMP.

SPECIFICATION forming part of Letters Patent No. 494,956, dated April 4, 1893.

Application filed August 29, 1891. Serial No. 404,110. (No model.)

*To all whom it may concern:*

Be it known that we, NILS JOHNSON and JOHN STOCKER, of St. Louis, Missouri, have made a new and useful Improvement in Ammonia or other Pumps, of which the following is a full, clear, and exact description.

The leading feature of this improvement is the inclosing of the compressing-mechanism from the atmosphere; that is, so that no movable part thereof extends, or need extend outward through the shell of the pump, or to the atmosphere, and thereby largely, if not entirely, preventing the leakage of the ammonia, and the trouble incident to the use of stuffing boxes, both of which difficulties are experienced in the use of ammonia pumps as hitherto constructed.

Another leading feature is the movableness of the barrel or barrels in which the pump-plungers work, to the end that the use of inlet or suction valves, as separate parts, may be dispensed with, and the plungers be enabled to work closer, if not close, to the end of their containing chambers.

The outlet, or compression, valves, especially in combination with the construction last referred to, and to enable the plungers in compressing the ammonia to be worked absolutely, and safely, to the extreme end of their respective containing chambers, are an additional feature.

Still another feature is the provision whereby the cooler, expanded, ammonia delivered to the pump is utilized in cooling the compressing-mechanism.

The improvement further relates to the means for accomplishing the movement of the pump-plungers: to the means for directing the application of the electric-current: to the means for controlling such application: and also to various details of the construction; all substantially as is hereinafter described and claimed, aided by the annexed drawings, making part of this specification, and exhibiting the most desirable mode of carrying out the improvement, and in which—

Figure 9:
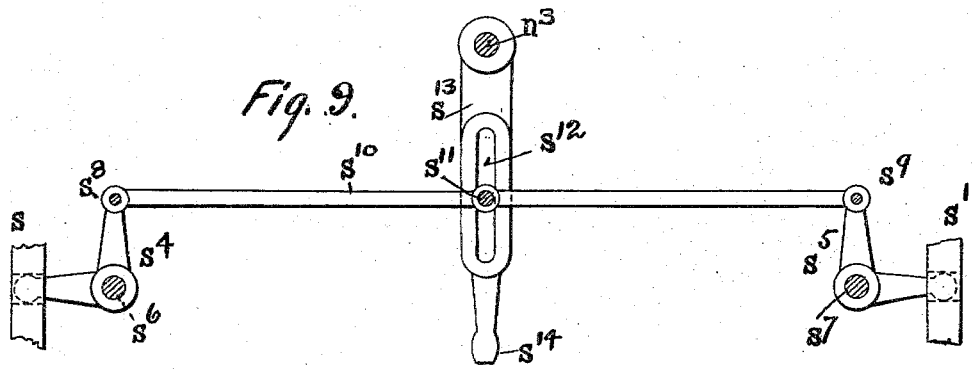
Figure 10:
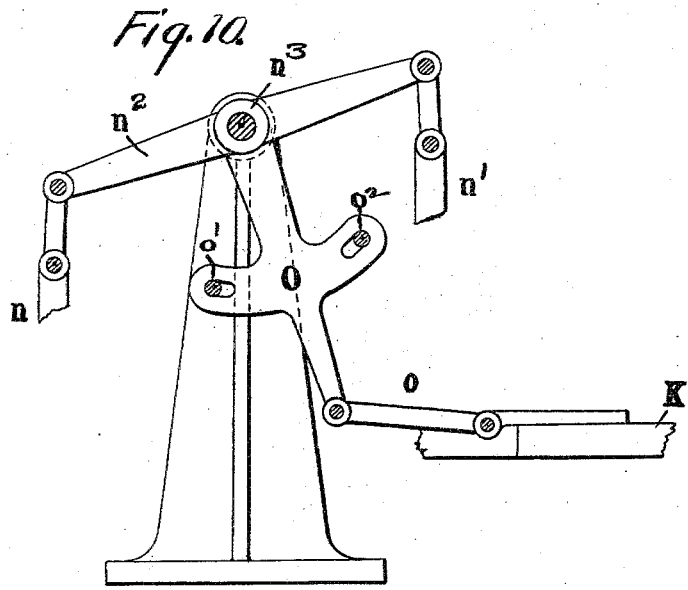

Figure 1 is a side elevation of the improved mechanism: Fig. 2 an end elevation thereof: Fig. 3 a vertical section on the line 3—3 of Fig. 1: Fig. 4 a sectional plan, the sectional portion being on the line 4—4 of Fig. 1: Fig. 5 a cross-section on the line 5—5 of Fig. 4: Fig. 6 a cross-section on the line 6—6 of Fig. 4: Fig. 7 a longitudinal section on the line 7—7 of Fig. 3, and also of Fig. 8 which last named view is a plan of the parts of Fig. 7: Fig. 9 a detail, being a sectional elevation of a portion of the current-shifter mechanism: Fig. 10 a detail, being a sectional elevation of a portion of the mechanism for adjusting the contact bar employed in connection with the main solenoids: Figs. 11, 12, 13, 14, and 15 views illustrating the compressing-operation; in Fig. 11 the plunger has moved to the right, and its barrel has also moved in the same direction, to admit the gas into the barrel: in Fig. 12 the barrel has closed again to the seat and the plunger has started to compress the gas: in Fig. 13 the plunger has nearly completed its stroke and the outlet valve has unseated to allow the compressed gas to escape: in Fig. 14 the plunger has made its stroke, the gas has escaped and the outlet valve is about seated: and in Fig. 15 the plunger and barrel are moving away from the seat: and Fig. 16 is a diagram showing the relation of the curves of magnetization and compression; Fig. 17 a side elevation of the movable portion of the compressing mechanism: Fig. 18 an end elevation of the same: Fig. 19 a cross section on the line 17—17 of Fig. 17: Fig. 20 a cross section on the line 18—18 of Fig. 17: Fig. 21 a cross section on the line 19—19 of Fig. 17 and also of Fig. 22 which, in turn, is a longitudinal section on the line 20—20 of Fig. 21: Fig. 23 a longitudinal section of the plungers, the section being on the line 21—21 of Fig. 24 which latter is an end elevation of the plungers.

The views are not all upon the same scale.

The same letters of reference denote the same parts.

Although the improvement can in a measure be carried out in a single-acting pump, it can be applied more effectively to a double acting one, A, substantially as shown.

The ammonia is supplied to the pump through the pipe B, whose branches, $b$, $b'$, connect with the chamber, C, which contains the principal portion of the compressing-mechanism. The ammonia might flow through a single passage into said chamber, but it can be supplied more evenly thereto in the manner shown. Said chamber extends from the part termed the seat, D, near one end of the pump to a corresponding part or seat, D', near the opposite end of the pump, and it is inclosed, in the present instance, by means of the tubular part, E, the end-parts, E', E², and said seats D, D'. The tube, E, is held between said end-parts, which are united by the bolts, e, and said seats are fixed in said end-parts respectively, and all so as to form a chamber sufficiently tight for containing the ammonia. The end-parts are extended beyond the positions of the seats, respectively, and, by means of the heads, E³, E⁴, which are applied to the end-parts, substantially as shown, other chambers, C', C², are inclosed at the outer side of the seats, D, D', respectively, substantially as shown. The last named chambers are also suitably constructed to confine the ammonia when compressed.

The three chambers, C, C', C², contain the mechanism for compressing the ammonia and inclose it from the outer atmosphere. The compressing-mechanism is composed substantially of plungers, F, F', the central part F², which unites the plungers, and is preferably integral, with them, the barrels, G and G', in which said plungers respectively work, the seats D and D', and the outlet valves, H and H'. The barrels are united, say by means of the frame-work G², and, although certain features of the improvement can be carried out in a construction in which the pump-barrels are fixed, we preferably make the barrels, as well as the plungers, movable, and for the purpose of doing away with inlet-valves as parts additional to the pump-barrels and utilizing the barrels themselves for controlling the admission of the gas thereto. To this end the two barrels, as one part, at each stroke of the plungers, and influenced by the electro magnetic force exerted upon them by the solenoids, which acts upon the united barrels, in the same manner as upon the plungers, move to and fro within the chamber C sufficiently to form an opening or inlet between the barrel and its opposing seat through which the gas is sucked into the barrel. That is, by means of the described movement of the barrels, an inlet, g, is formed, first, between the barrel G' and its opposing seat D', and then on the return stroke of the plungers, a similar inlet is formed between the barrel G and its opposing seat D. The barrels are suitably sustained and directed in their movement by guides g', g'.

In each seat, D, D', is an opening, d, in size, shape, and position, corresponding to the opening, $g^2$, in the opposing barrel, and into which the plunger passes to complete its stroke, substantially as shown, for, in making its stroke to compress the gas, the plunger moves outward through the barrel and into, and to the outer end of the opening, d, in the seat, at which point it encounters the outlet-valve as soon as the intervening body of compressed gas has escaped from between the plunger-end and the face of the outlet-valve. That is, the outlet-valve, by any suitable means, such as the spring, h, is held against the outer side of the seat D, saving when the gas is being compressed sufficiently to cause the outlet-valve to yield and unseat, whereupon the outlet-valve is forced away from its seat until the compressed gas in front of the plunger has escaped, when the spring acts to close the outlet-valve against the seat and plunger, as indicated by the position of the outlet valve, H, and plunger, F, Fig. 4. After the gas has been admitted through the opening g into the plunger, and as the plunger moves to compress the gas, the barrel closes against its opposing seat, and the barrel and seat jointly form the chamber in which the gas is compressed. On the return stroke of the plungers the barrels also move in the same direction, that barrel which has been closed to its seat opening apart therefrom, and the other barrel, at the opposite end of the chamber C, closing to its seat, whereupon the compressing operation is effected at that end of the pump, and so on, alternately at the opposite ends of the compressor. The compressed gas after being delivered into the chambers, C', C², passes, through suitable pipes, i and i', to the pipe I, and thence as desired. The outlet valves are sustained and adapted to work as described in suitable cases, h', h'. In this manner ammonia can be compressed by means which are wholly shut in from the surrounding atmosphere. In addition thereto it will be noticed that the need which has hitherto existed for appropriating a portion of the space within the compressing chamber for the valves to operate in is obviated. In the present construction, by reason of the described moveableness of the plunger-barrels, no room whatever is required for an inlet-valve, and owing to the described mode of constructing and operating the outlet valves no clearance is required in connection with them. When the plunger moves to compress the gas it passes entirely through the barrel and seat so as to come flush with the outer side of the last named part, the outlet valve recovers quite closely against the plunger in that position, and when the plunger retreats there is no ammonia, to any appreciable extent, between the plunger and the outlet valve to expand again into the compression chamber. Furthermore it will be seen that the expanded ammonia circulates within the chamber C effectively around the compressing-mechanism and thereby performs a valuable work in keeping down the temperature of the plunger and plunger barrel. To this end the most desirable construction is the one shown, namely, one in which the expanded ammonia can circulate substantially wholly around the compressing mechanism. The guides, g', are perforated or made open at $g^3$ to provide for the described circulation, and from one end to the other of the chamber C the movable parts are sufficiently perforated, and separated from the inclosing shell, to permit of the passage of the expanded ammonia. A large portion of the plungers at each stroke thereof is exposed directly to the described cooling agent, and the barrels can in practice be made quite thin, substantially as shown, and thereby favorably constructed to the end under consideration.

We desire not to be restricted to any one means for operating the plungers and plunger-barrels in the manner described. Our preferable means however are as follows: Electrical currents are used and in such a manner as to cause the plungers and barrels to be moved in the manner set forth.
The most desirable mode of applying the agent referred to is exhibited as follows: J, J', represent one or more solenoids which surround the tube E. When excited they have sufficient strength to act upon the inclosed compressing-mechanism for the purpose in question. When the plungers and barrels are at one end of the chamber C the electrical influence is concentrated more especially in that portion of the solenoids which is at the opposite end of said chamber and the plungers and barrels are caused to move toward said opposite end, and, to effect the return stroke of the described parts, the magnetic influence is shifted into that portion of the solenoids which is opposite the other end of said chamber, and so on, applying the magnetic influence first at one end and then at the opposite end of the pump. The various parts of the construction are suitably constructed in accordance with the laws of electricity to enable the solenoids to act upon the moving parts of the compressing-mechanism as described. That is, for instance, the tube E is of suitable material to permit of the influence of the current of the solenoids being exerted upon the compressing-mechanism, and the parts of said compressing-mechanism are also of suitable materials to be influenced by electrical or magnetic forces.
The preferred method of applying the electric current to the solenoids is as follows: The various coils, $j$, of the solenoids are provided respectively with contacts $j'$. The contacts are arranged in series as shown more distinctly in Figs. 7 and 8. K represents what may be termed an adjustable contact bar. It is provided with two contacts, $k$, $k'$, which, respectively, coact with the contacts, $j'$, of the solenoid J and the contacts, $j'$, of the solenoid J'. According to the position of said part K is the application of the electric current to the solenoids. In Fig. 7 said part K is shown in position for directing the current into the right hand solenoid more especially:
that is, the current passes from the contact $k$ to the right hand contact, $j'$, of the solenoid J, thence through the right hand coil, $j$, of that solenoid, thence over the wire $j^2$ to the left hand one, $j$, of the coils of the solenoid J', and thence throughout said last named solenoid J', and thence to the wire L. It should be said that the several contacts, $j'$, of each solenoid are suitably electrically connected to enable the current to pass through the entire solenoid or so much thereof as may be needed for the current to complete its circuit along the line of least resistance. When the part K is shifted into its position indicated by the broken lines, Fig. 7, the current is mainly through the solenoid J; that is, from the contact $k'$ to the contact $j'$ of the left hand coil, $j$, of the solenoid J', thence along the wire $j^2$, to the right hand one of the coils of the solenoid J, thence through that last named solenoid, and thence onto the wire M.

The preferable means for adjusting the part K as described is as follows: N and N' represent two upright solenoids which, when excited, respectively act upon their cores, $n$, $n'$, to draw them downward. Said cores are jointed to a beam, $n^2$, which is fastened to a shaft $n^3$, and which in turn has attached to it an arm O. When the left hand solenoid, N, Fig. 7, is excited, and its core thereby drawn downward as represented in that figure, the arm O, is thereby moved to the right, and in consequence the part K, by means of the link, $o$, which connects the part K with the arm O, is shifted to the right as shown in the full lines in Fig. 7. When the electric current is diverted from the solenoid N, and the other solenoid N' is excited, the core, $n'$, of the solenoid N' is drawn downward, and the parts in consequence assume the position indicated by the broken lines in Fig. 7; that is, the arm O and the part K are shifted to the left as shown in that figure.

The preferable manner for directing the current to the solenoids N, N', for the purpose described is as follows: Let P represent the wire leading from the source of the electric current; it connects with a binding post, $q'$, upon what may be termed the current-shifter, Q. Said shifter is adapted to be adjusted forward and backward as indicated by its various positions shown in Fig. 7. It is provided with two binding posts, the post $q'$ with which said wire P connects, and the post $q$ with which said wire M connects. Underneath said shifter are four contacts, R, R', $R^2$ and $R^3$. When said shifter, Q, is moved to the left, as viewed in Figs. 7 and 8, its binding posts, $q'$ and $q$, are respectively brought into contact with the contacts $R^2$ and R, and when the shifter, Q, is moved to the right its binding posts, $q'$ and $q$ respectively come into contact with the contacts $R^3$ and R'. When the contacts $q'$ and $R^2$, and $q$ and R, are respectively in touch the current passes from the wire P, to the wire $n^5$, and thence to the solenoid N, and from that solenoid, over the wire $n^{10}$, to the contacts R, $q$, and thence over the wire M to the solenoid J, and thence as described. When the contacts $q'$ and $R^3$, and the contacts $q$ and R', are respectively in touch the current passes from the wire P, to the wire $n^{15}$, and thence to the solenoid N', and from that solenoid, over the wire $n^{20}$, to the contacts R', $q$, and thence over the wire M, to the solenoid J, and thence as described.

The current-shifter, Q, is, in turn, operated preferably as follows: S and S' represent what may be styled magnetic pole pieces. They are arranged respectively opposite the end portions of the chamber C, and adapted to have a movement toward and from the compressing-mechanism. Although the improvement in part can be carried out with said pieces otherwise operating they are in the present instance not allowed to enter the chamber C, but in their movement they are kept without said chamber, but sufficiently near thereto to be controlled by the magnetic influence exercised by the moving mass (in the present instance consisting chiefly of the plungers F, F' and the part $F^2$ which unites said plungers, and principally said last named part, $F^2$, which, as seen, is preferably made considerably larger in diameter than said plungers, partly for the purpose of imparting more momentum to said plungers as they move to compress the ammonia, and partly for the purpose of being more effective as a magnet for the particular purpose under consideration, as well as to coact favorably with the main solenoids, J, J') within the chamber C as it moves to and fro therein. That is to say, under the influence of the solenoids J, J', said mass becomes more or less magnetized, and sufficiently so to attract said pole-pieces alternately at each stroke of said mass. Said pole pieces are respectively attached to the rods, $s$, $s'$, which in turn are held and adapted to work, toward and from the tube E, in suitable bearings, $s^2$, $s^3$, respectively. As the mass, $F^2$, F, F', moves to come opposite a pole-piece, say the pole-piece S, that piece is drawn toward the tube E, and the opposite pole piece is released from said magnetic influence, or is not subjected to as strong magnetic influence, and, when said mass moves in the opposite direction, the first named piece, S, is similarly released and the piece, S', is attracted. The rods, $s$, $s'$, are connected, and their described movement communicated, as follows: $s^4$ and $s^5$ (see Fig. 9) represent bell-cranks connecting respectively with said rods, and pivoted respectively at $s^6$ and $s^7$, and at $s^8$ and $s^9$, respectively jointed to a bar, $s^{10}$, which in turn is provided with a pin, $s^{11}$, that engages in a slot, $s^{12}$, in a pendent arm, $s^{13}$, journaled upon the shaft $n^3$, or other equivalent bearing. Said arm $s^{13}$, at its lower end, $s^{14}$, engages with the current-shifter Q. Hence the alternate movement of said pole-pieces serves to accomplish the described movement of said current-shifter. The stroke of the pump can be regulated, that is, shortened or lengthened, by means of the springs, $s^{15}$, $s^{15}$. That is, the springs, with ordinary means such as shown, can be stiffened or loosened as may be desired to enable said pole-pieces to move accordingly. That is, the stiffer the springs are the slower the pole-pieces move toward the cylinder, and the later the electric current is shifted. Different kinds of magnetic pole-pieces also can be employed, and all to enable the compressive mechanism to be sensitively responsive to the electric influence described. To better insure the release at the proper time of that pole-piece from which the parts, $F^2$, &c., are moving the arm O is provided with shoulders, such as the pins, $o'$, $o^2$, which, in the vibration of said arm O, encounter the pendent arm, $s^{13}$, and cause it to move and in consequence actuate the pole piece as desired. An additional means for controlling the movement is the dash-pot, T, above each solenoid N, N'. Said dash-pots in themselves are of the ordinary construction, having a piston, $t$, attached to the solenoid core, and also having an outlet, $t'$, through which the air can escape from the dash-pot; by controlling said air-outlet the movement of said cores can be controlled.

We desire not to be restricted to any particular mode of wiring said solenoids. Two other features of the improvement will be mentioned: the relation of the force exerted by the main solenoids to the resistance encountered by the compressing-mechanism, and, second, the relation of the main solenoids to the chamber, C, which contains the expanded gas. It will be noticed that the magnetizing force exerted increases more and more and is at its maximum at the end of the stroke of the compressing-mechanism; that is, when the greatest resistance is encountered by the pump-plungers the greatest power is being supplied. The diagram of Fig. 16 is used to illustrate this relation, the curve in full lines $x$ being the one representing the work to be performed, and the curve in broken lines, $y$, representing the force exerted by the magnets. It will also be noticed that the cold of the expanded gas within the chamber C can be, and is, utilized not only for cooling the compressing mechanism, but also for keeping down the temperature of the solenoids, J, J'. The difficulty arising from the passage of an electric current through a coil in heating it and thereby creating a resistance to its movement is well understood. But by means of the proximity of the cold referred to the temperature of the solenoids in the present instance can be very advantageously kept down.

By the term "compressing-mechanism" herein used we mean the movable parts which are in contact with the ammonia or other fluid being operated upon. By the term "plunger" we desire to include a piston, ram, or any equivalent part used in compressing or moving fluids.

We do not confine ourselves to ammonia in the use of the present improvement, as many other fluids can be compressed or moved by means thereof, and wherever we use the term ammonia we desire to have it understood that it includes other fluids which are adapted to be operated upon by means of the mechanism under consideration.

While we rely largely upon the magnetic influence described for holding the barrels to their respective seats during the compression or movement of the fluid we also utilize the barrels themselves as magnets; that is, each barrel becomes a magnet and as it comes into contact with its seat its magnetic force serves to secure it to its seat for the time being, and to this end the seat is composed of suitable material to coact as described with the barrel. This force is overcome when the solenoids act to draw the compressing mechanism in the opposite direction. There are also annular grooves, $g^4$, in the end of the barrel, and also in the opposing face of the seat, $d$, which serve to tighten the joint between the barrel and the seat. That is, any gas escaping into the inner one of the grooves expands therein, and hence the pressure of that gas which escapes into the next outer groove is reduced, and so on throughout the series of the grooves. A groove, $g^5$, is formed at each end of the part $F^2$ to receive the opposing end of the barrel. The gas from the chamber C enters said grooves, and, in the event the part $F^2$ in its movement tends to strike the barrel too violently the gas in said groove serves to cushion the blow. So far as the movable feature of the herein described barrel or barrels is concerned, and for the purpose of dispensing with an inlet valve as a separate part, we desire not to be restricted to a pump whose compressing-mechanism is inclosed as described, nor to electricity, or any other special power, as a means for operating the compressing-mechanism. Nor do we wish to be confined to a compressor, for said movable barrel can be used in many forms of pumps as well as compressors.

The operation of the mechanism under consideration, briefly stated is as follows: Upon applying the electric current the solenoids are alternately energized as described. Suppose the left hand solenoid, as viewed in Fig. 4, is energized; the movable parts of the compressing-mechanism are thereby moved to the left, and the left hand barrel and plunger are respectively moved against and into the opposing, left-hand, seat, and the fluid which has previously entered that barrel is thereby forced past the outlet-valve at that end of the construction and thence to the escape; meanwhile the plunger and barrel at the opposite end of the construction are withdrawn from their coacting seat, and the fluid to be compressed has been admitted into that barrel; meanwhile the movable portion of the compressing-mechanism, and more particularly the part $F^2$, thereof, having become magnetized under the influence of the solenoid, has in turn attracted the left-hand pole-piece and the electric current is thereby shifted into the other solenoid, and in consequence the movable portion of the compressing-mechanism is moved in the opposite direction in the construction, the fluid is compressed at that end thereof and discharged, the left hand pole-piece is released, the right-hand pole piece attracted, and the electric current again shifted back into the first named, or left hand solenoid, and the operation is repeated.

A special feature of the present construction is making the part $F^2$, considerably larger than the plungers. By this means an electric force can be exerted more advantageously upon the plunger. The part $F^2$, as previously suggested, serves several ends: to connect the plungers to enable them to move as one part; as a magnetizable body susceptible to the influence of the solenoids to be drawn thereby to and fro to actuate the plungers or plunger, according as the pump may be double or single acting; as a weight to increase the efficiency of the plungers, especially toward the end of the stroke, and which is desirable in a compression pump; and as a magnet for exerting a magnetic influence upon any movable part, such as the described pole pieces, suitable for directly or indirectly effecting the switching of the electric current of the solenoid or solenoids. To these ends said part, $F^2$, may be of any suitable form, proportions, and arrangement, although the most desirable shape and relative size and position are, perhaps, shown. As the part virtually forms a portion of the plunger or plungers it may conveniently be termed the plunger-head. By making it of larger diameter than that portion of the plunger-mechanism which works in the barrels more electric influence can be brought to bear upon the plunger, and therefore more force be concentrated in that part of the plunger-mechanism which works in the barrels.

We desire not to be restricted to the described pole pieces for communicating the described magnetic influence of the plunger, as any equivalent part or parts may be used therefor.

The manner of connecting the plungers F, F', the plunger-head $F^2$, frame $G^2$, and barrels G, G', is shown more distinctly in Figs. 17 to 22, and Figs. 23 and 24 show the plunger-mechanism by itself. The frame, $G^2$, in its most desirable form, consists essentially of the rods $g^{15}$ and the ears $g^{10}$, and, in practice, the ears are made part of the barrel, and the ears are slotted to receive the rods, and the rods are secured by pins, $g^{25}$, substantially as shown. The plunger-head, $F^2$, is grooved at $f^5, f^5, f^5$, to provide room for the rods $g^{15}, g^{15}, g^{15}$. The frame, $G^2$, in a manner analogous to that in which the plunger mechanism is actuated by the described magnetic influence, is influenced to move as described, and shift the barrels, by the magnetic force of the solenoids. In addition to this, and in some instances in place of it, the friction of the plunger within the barrel causes the barrel to be moved as described toward and from its opposing seat. The plunger, in manner analogous to that of other pumps or engines, is provided usually with suitable packing rings $f^{10}, f^{10}$, substantially as shown in Figs. 22, 23. It will further be noted that we exhibit a pump whose plunger has a defined stroke, although operated without any mechanical connection leading thereto and controlling its movement. Others have proposed the application of the force of electro magnetism to move a piston within a cylinder, but the piston referred to has no defined regular movement: it does not, as the resistance to its movement increases or varies, move always to the same limit, and hence it is of but slight, if any, value in a compression pump. Our plunger, on the contrary, by reason of its described stroke, can be used in a mechanism for the compression of gas, as well as in a lifting pump.

We claim—

1. A pump having a plunger working in a reciprocating manner to and fro within a chamber of the pump, and also having a solenoid surrounding said chamber for exerting an electro magnetic influence upon said plunger to effect the described movement thereof, and also to magnetize the same, and also having a movable, magnetizable, part to direct the switching of the current through said solenoid and which is moved by reason of the magnetic influence exerted by said plunger, acting through the shell of the pump substantially as described.

2. The combination of the plunger, the movable barrel, the seat, and the outlet valve, said barrel opening apart from and closing to the inner face of said seat, said plunger working through said barrel and into said seat, and said outlet valve seating against the outer face of said seat, substantially as described.

3. The combination of the plunger, the movable barrel, the seat, and the outlet valve, said barrel opening apart from and closing to the inner face of said seat, said plunger working through said barrel and through said seat, and said outlet-valve seating against the outer face of said seat, substantially as described.

4. The combination in an ammonia pump of the chamber C, the annular seats D, D', arranged respectively toward the ends of said chamber, the barrels united to move as one part between said seats, and the plungers united to move as one part into and between said seats, substantially as described.

5. The combination in an ammonia pump, of the chambers C, C', C², the annular seats D, D', arranged respectively toward the ends of said chamber C, the connected barrels moving as one part between said seats, the connected plungers moving as one part into and between said seats, and the outlet valves arranged respectively in said chambers, C', C², substantially as described.

6. In an ammonia pump the combination of the compressing-mechanism, the chamber, C, inclosing said compressing-mechanism, and the solenoid or solenoids surrounding said chamber, said compressing mechanism being smaller in diameter than said chamber to enable the expanded gas to circulate between said compressing mechanism and the shell of said chamber for the purpose of keeping down the temperature of said solenoid or solenoids, substantially as described.

7. In a pump or other construction having a plunger or other part working in a reciprocating manner within a chamber, and actuated by electro magnetic force applied to said plunger or part and alternately in the direction in which said plunger or part moves, the combination of the solenoid, the plunger, the seat, and the reciprocating barrel, said barrel and seat being magnetically attracted to each other as said solenoid is energized in the direction of said seat, substantially as described.

8. In a pump or other construction having a plunger or other part working in a reciprocating manner within a chamber, and actuated by electro magnetic force applied to said plunger or part and alternately in the directions in which said plunger or part moves, the combination of the solenoid, the plunger, or other reciprocating part, and the enlarged plunger head, substantially as and for the purpose described.

9. In a pump or other construction having a plunger or other part working in a reciprocating manner within a chamber, the combination of the enlarged plunger head grooved at $g^5$, the plunger, and the barrel, the end of said barrel as said plunger head moves toward it, entering said groove and cushioned by the gas therein, substantially as described.

Witness our hands this 26th day of August, 1891.

NILS JOHNSON.
JOHN STOCKER.

Witnesses:
C. D. MOODY,
A. BONVILLE.